(12) United States Patent
Okuda (10) Patent No.: US 10,272,849 B2
(45) Date of Patent: Apr. 30, 2019

(54) IN-VEHICLE CAMERA ATTACHED TO WINDSHIELD FORMING INHIBITION SPACE THEREBETWEEN

(71) Applicant: DENSO CORPORATION, Kariya, Aichi-pref. (JP)

(72) Inventor: Syo Okuda, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 233 days.

(21) Appl. No.: 14/388,146

(22) PCT Filed: Mar. 1, 2013

(86) PCT No.: PCT/JP2013/055632
§ 371 (c)(1),
(2) Date: Sep. 25, 2014

(87) PCT Pub. No.: WO2013/146093
PCT Pub. Date: Oct. 3, 2013

(65) Prior Publication Data
US 2015/0042804 A1 Feb. 12, 2015

(30) Foreign Application Priority Data
Mar. 28, 2012 (JP) ................................ 2012-074641

(51) Int. Cl.
*B60R 11/04* (2006.01)
*B60R 11/00* (2006.01)
(52) U.S. Cl.
CPC ....... *B60R 11/04* (2013.01); *B60R 2011/0026* (2013.01); *B60R 2011/0033* (2013.01);
(Continued)

(58) Field of Classification Search
None
See application file for complete search history.

(56) References Cited

U.S. PATENT DOCUMENTS 5,260,827 A * 11/1993 Dziekan ................ F21V 9/10
359/488.01
6,799,904 B2 * 10/2004 Schaefer ................ B60R 11/04
348/148
(Continued)

FOREIGN PATENT DOCUMENTS

DE       10237606 A1   3/2004
DE    102010023293 A1  12/2011
(Continued)

OTHER PUBLICATIONS

International Preliminary Report on Patentability (in Japanese with English Translation) for PCT/JP2013/055632, dated Oct. 1, 2014.
(Continued)

*Primary Examiner* — Edemio Navas, Jr.
(74) *Attorney, Agent, or Firm* — Harness, Dickey & Pierce, P.L.C.

(57) ABSTRACT

A vehicle-mounted camera has a lens disposed on a protruding part, which protrudes from the upper surface of a vehicle-mounted camera body; thus, compared to the situation in which the entire vehicle-mounted camera body is positioned below a bracket, the lens can be positioned at the shortest distance from a windshield, thereby enabling the length of a hood to be reduced. Furthermore, the in-vehicle camera is able to take up a large area of the portion of the bracket affixed to the windshield.

6 Claims, 6 Drawing Sheets

(52) U.S. Cl.
CPC ............... *B60R 2011/0059* (2013.01); *B60R 2011/0071* (2013.01); *B60R 2011/0075* (2013.01)

(56) References Cited

U.S. PATENT DOCUMENTS

| | | | |
|---|---|---|---|
| 2003/0059218 A1* | 3/2003 | Sakata | G03B 17/08 396/429 |
| 2006/0132603 A1* | 6/2006 | Sato | B60R 11/04 348/148 |
| 2009/0046150 A1 | 2/2009 | Hayakawa et al. | |
| 2009/0201700 A1 | 8/2009 | Aso et al. | |
| 2010/0065707 A1 | 3/2010 | Hansel | |
| 2011/0163904 A1* | 7/2011 | Alland | B60R 1/00 342/1 |
| 2012/0013741 A1* | 1/2012 | Blake, III | B60R 11/00 348/148 |
| 2014/0160284 A1* | 6/2014 | Achenbach | H04N 5/2251 348/143 |
| 2015/0015713 A1* | 1/2015 | Wang | H04N 7/18 348/148 |

FOREIGN PATENT DOCUMENTS

| | | |
|---|---|---|
| EP | 2246219 A1 | 11/2010 |
| JP | 2008206224 A | 9/2008 |
| JP | 2009044342 A | 2/2009 |
| JP | 2009545760 A | 12/2009 |
| JP | 2010042703 A | 2/2010 |

OTHER PUBLICATIONS

International Search Report (in Japanese with English Translation) for PCT/JP2013/055632, dated May 28, 2013; ISA/JP.
Written Opinion for PCT/JP2013/055632, dated May 28, 2013; ISA/JP.

* cited by examiner

IN-VEHICLE CAMERA ATTACHED TO WINDSHIELD FORMING INHIBITION SPACE THEREBETWEEN

CROSS REFERENCE TO RELATED APPLICATIONS

This application is a U.S. National Phase Application under 35 U.S.C. 371 of International Application No. PCT/JP2013/055632 filed on Mar. 1, 2013 and published in Japanese as WO 2013/146093 A1 on Oct. 3, 2013. This application is based on and claims the benefit of priority from Japanese Patent Application No. 2012-074641 filed on Mar. 28, 2012. The entire disclosures of all of the above applications are incorporated herein by reference.

TECHNICAL FIELD

The present invention relates to an in-vehicle camera that is attached to a windshield of a vehicle from inside.

BACKGROUND ART

A conventional in-vehicle camera that monitors the conditions ahead of the vehicle has a structure where a casing is mounted to a ceiling of the vehicle, the casing has an opening in a surface facing the windshield, and the camera is disposed inside the casing.

Since the casing of the in-vehicle camera has the opening in the surface facing the windshield, a hood is provided for preventing so-called background reflections, a phenomenon where the light from the inside of the vehicle is reflected by the inner surface of the windshield thereby entering the camera.

The hood has a structure extending from a front end portion, facing the windshield, of a lower portion of the casing toward the windshield to cover a gap. Inclination of the windshield is different according to type of vehicles, and as a result the length of the gap is also different. Accordingly, the hood has a structure where the length of the extension can be changed (PTL1).

The in-vehicle camera having the above-described structure, however, needs a device for changing the extension length of the hood. Also, the camera has to have a structure where the hood slides. Because of these, the camera grows in size.

Accordingly, recently, the following structure is adopted. In the structure, a bracket is attached to the windshield, an in-vehicle camera body, which is the casing accommodating the camera, is fixed by the bracket under it.

The in-vehicle camera having such a structure also needs the hood. The hood prevents light from entering from the outside into a space including at least a defined space defined by an angle of field of the lens, in a space between the lens provided in the in-vehicle camera body and the windshield.

However, the in-vehicle camera having such a structure also has a problem where the length of the hood is large especially when the inclination angle of the windshield is large.

Further, the in-vehicle camera having such a structure also has another problem where there is a need for securing a large area of a surface, which is attached to the windshield, of the bracket, in view of preventing the in-vehicle camera from dropping from the windshield.

PTL 1 Japanese Patent Application Publication No. 2010-42703

SUMMARY

In light of such circumstances, it is desired to provide an in-vehicle camera which can secure a large area of a portion, which is attached to a windshield, of a bracket, and which can shorten length of the hood.

An in-vehicle camera according to an embodiment of the present invention has: a bracket to be attached to an inner surface of a windshield; and an in-vehicle camera body having a lens and fixed to the bracket, wherein: the bracket has an attachment portion and a mounting portion, the attachment portion being attached to the windshield, the mounting portion supporting the in-vehicle camera body under the attachment portion; the in-vehicle camera body has a facing portion, a projection portion and a light-blocking portion, the facing portion being disposed under the attachment portion when the in-vehicle camera body is fixed to the bracket, the projection portion having a step projecting upward from the facing portion, the lens being provided to the projection portion, the light-blocking portion forming an inhibition space including at least a defined space defined by an angle of field of the in-vehicle camera body through the lens in a space between the lens and the windshield, the light-blocking portion configured to block light from the outside of the inhibition space to the inside of the inhibition space; and the attachment portion has a first cut-out portion forming a space along the windshield above the projection portion when the in-vehicle camera body is fixed to the bracket.

DETAILED DESCRIPTION OF THE PREFERRED EMBODIMENTS

Hereinafter, an embodiment of the present invention is described with reference to the drawings.

An in-vehicle camera of the present invention is used for imaging and monitoring the conditions ahead of the vehicle. In the following description, a forward direction is defined to be a direction to which the in-vehicle camera is oriented in a state where the in-vehicle camera is correctly mounted to the windshield of the vehicle at a predetermined position thereon to image the conditions ahead of the vehicle.

Further, the terms rearward, rightward, leftward, upward and downward used in the following description are the directions based on triangular projection with the forward direction relative to the vehicle being a front (indicated by arrows in FIG. 1), and thus the description referring such as to plan views or rear views is also based on triangular projection.

General Structure

Figure 1:
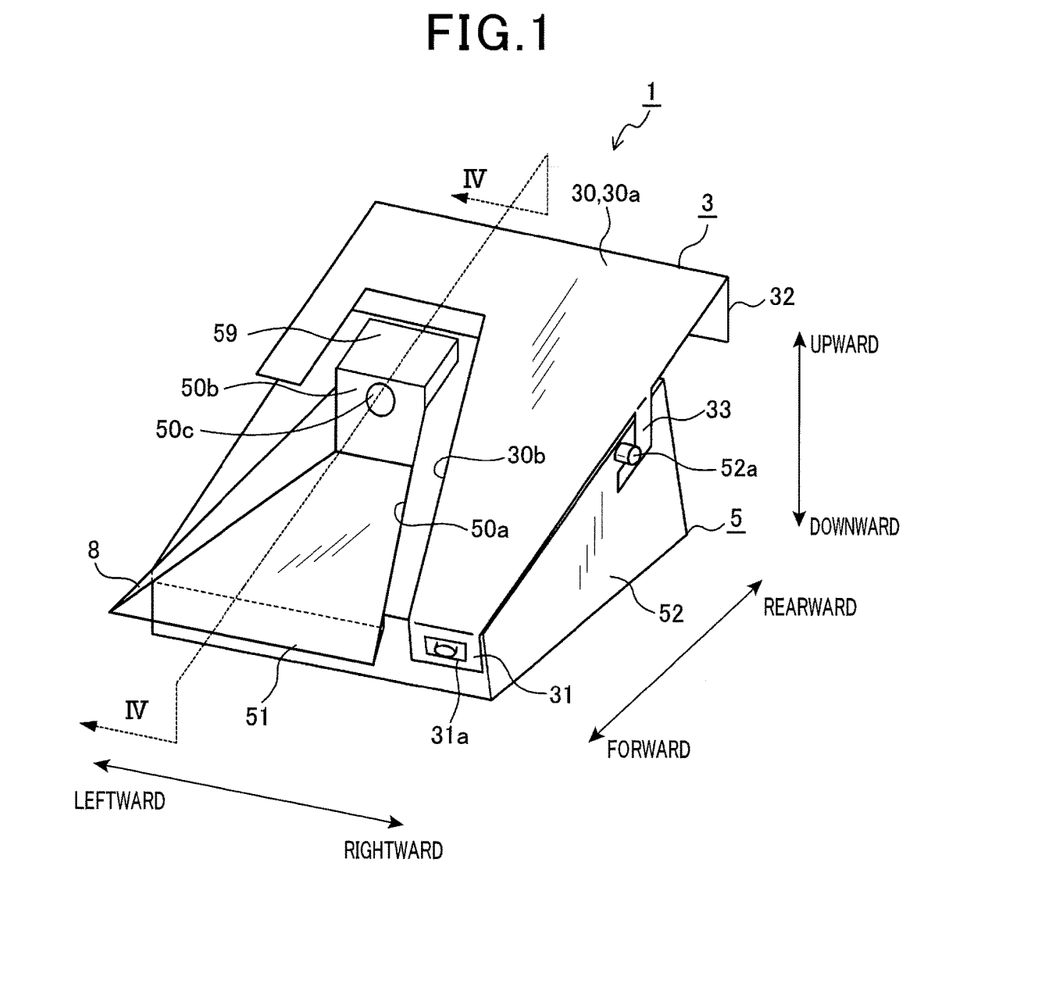
FIG. 1 is a perspective view of an in-vehicle camera of an embodiment of the present invention, as viewed from obliquely above.

As shown in FIG. 1, an in-vehicle camera 1 of this embodiment includes a bracket 3 that is attached and fixed onto a windshield from inside the vehicle, and an in-vehicle camera body 5 that has a housing in which an imaging device and the like are accommodated.

Bracket

Figure 2:
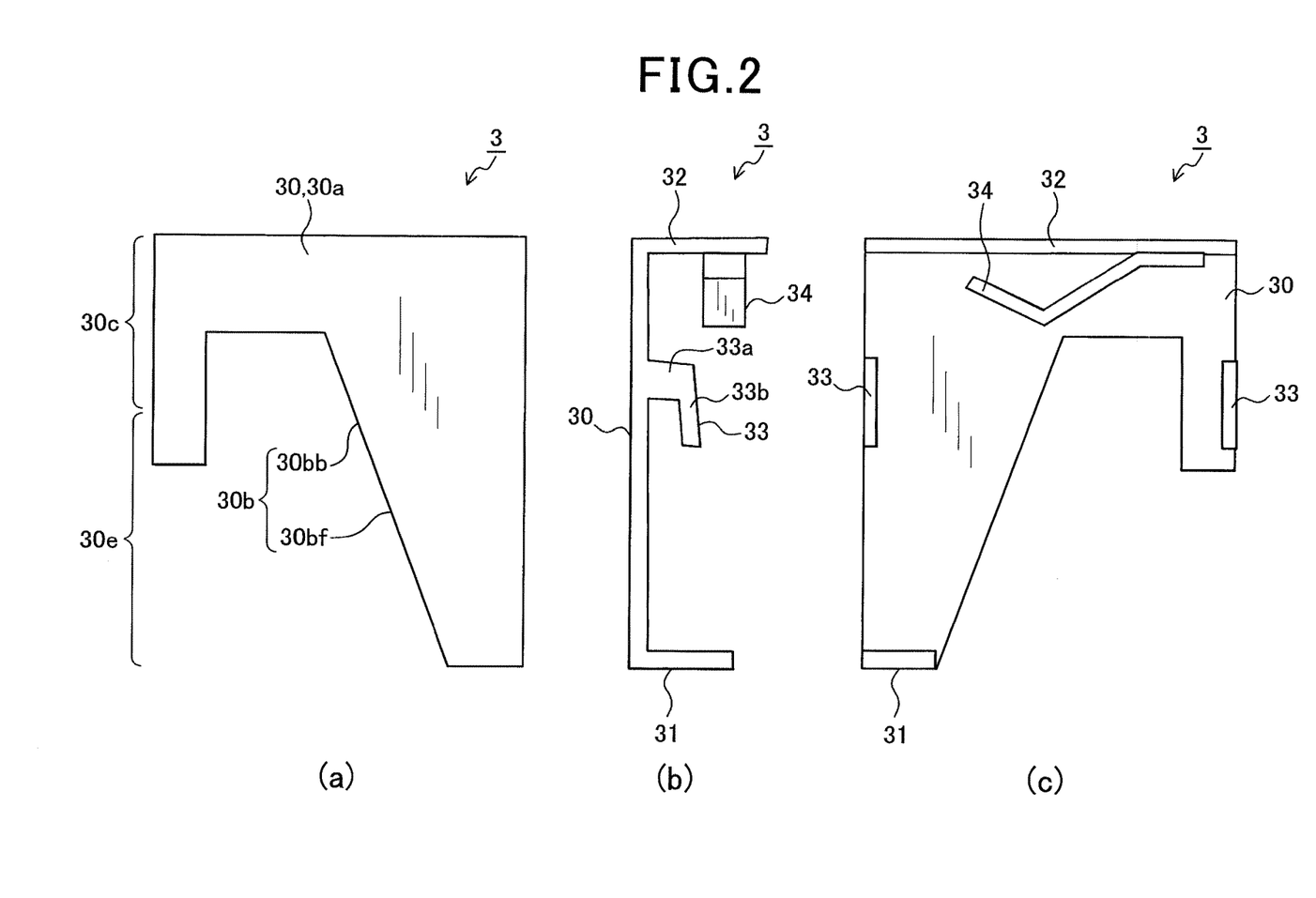
FIG. 2 shows explanatory views, on a triangular projection basis, of a bracket constituting the in-vehicle camera of the embodiment with (a) being a plan view, (b) being a right side view and (c) being a bottom view.

As shown in FIG. 1 and FIG. 2 by (a), the bracket 3 includes an attachment portion 30 that is attached to a windshield The attachment portion 30 includes an attachment surface 30a that is attached to a windshield. The attachment surface 30a is formed into a flat shape so as to extend along the glass surface in a portion of a windshield, to which the bracket 3 is attached. The attachment surface 30a has a shape substantially covering an upper surface of the in-vehicle camera body 5. The attachment surface 30a has a rear portion 30c and a front portion 50d. The rear portion 30c is disposed behind a lens 50c of the camera. The front portion 50d extends ahead of the lens 50c.

The attachment portion 30 has a first cut-out portion 30bb. The first cut-out portion 30bb is formed by cutting out a portion by an area slightly larger than a projection portion 59, described later, of the in-vehicle camera body 5. The portion that is cut-out includes a portion that is opposed to the projection portion 59, when the in-vehicle camera body 5 is mounted to the bracket 3. Further, the attachment portion 30 has a second cut-out portion 30bf. The second cut-out portion 30bf is formed by cutting out a portion by an area slightly larger than a recess 50a, described later, of the in-vehicle camera body 5. The portion that is cut-out includes a portion that is opposed to the recess 50a, when the in-vehicle camera body 5 is mounted to the bracket 3. The first cut-out portion and the second cut-out portion are combined to form one cut-out portion 30b.

This cut-out portion 30b is formed not to obstruct the field of view of the in-vehicle camera body 5, when the in-vehicle camera body 5 attached to the bracket 3 images the conditions ahead of the vehicle through the windshield. Also, the cut-out portion 30b is formed into a shape into which the projection portion 59 described later can be inserted.

The bracket 3 includes a front end portion 31 and a rear end portion 32, as shown in FIG. 1 and (b) of FIG. 2. The front end portion 31 is a portion bent downward from a front end of the attachment portion 30 on the right of the cut-out portion 30b, i.e. a portion extended downward from the front end of the attachment portion 30. The rear end portion 32 is a portion bent downward from a rear end of the attachment portion 30, i.e. a portion extended downward from the rear end of the attachment portion 30. It should be noted that the term "bent" expresses a shape and thus should not be construed as limiting a processing method. Specifically, for example, the bracket 3 of this embodiment is formed by press-molding a metal plate. However, this should not impose a limitation. The bracket 3 may be formed by casting or sintering. Alternatively, the bracket 3 may be made such as of a resin material.

The front end portion 31 is provided with an engagement hole 31a into which an engagement projection 51a, described later, provided to a front side surface of the in-vehicle camera body 5 is inserted and fitted.

As shown in FIG. 1 and FIG. 2 by (b) and (c), the bracket 3 includes a pair of hook portions 33 which are arranged on right and left ends of the bracket 3. Specifically, the hook portions 33 are each formed being extended from the right or left side of the attachment portion 30 so as to be perpendicular thereto, and each have a hooked end extended forward along the attachment surface 30a. The pair of hook portions 33 are positioned slightly rearward relative to the center in a longitudinal direction.

The hook portions 33 each include a base 33a and a hook 33b. The base 33a is projected downward from the attachment portion 30. The hook 33b is extended forward along the attachment surface 30a from a lower end of the base 33a and has a length larger than that of the engagement projection 51a, described later.

The rear end portion 32 has an inner surface (front side face) which is provided with the leaf spring 34.

It will be noted that the front end portion 31, the rear end portion 32, the engagement hole 31a, the hook portion 33 and the leaf spring 34 corresponds to the mounting portion in the claims.

In-Vehicle Camera Body

Figure 3:
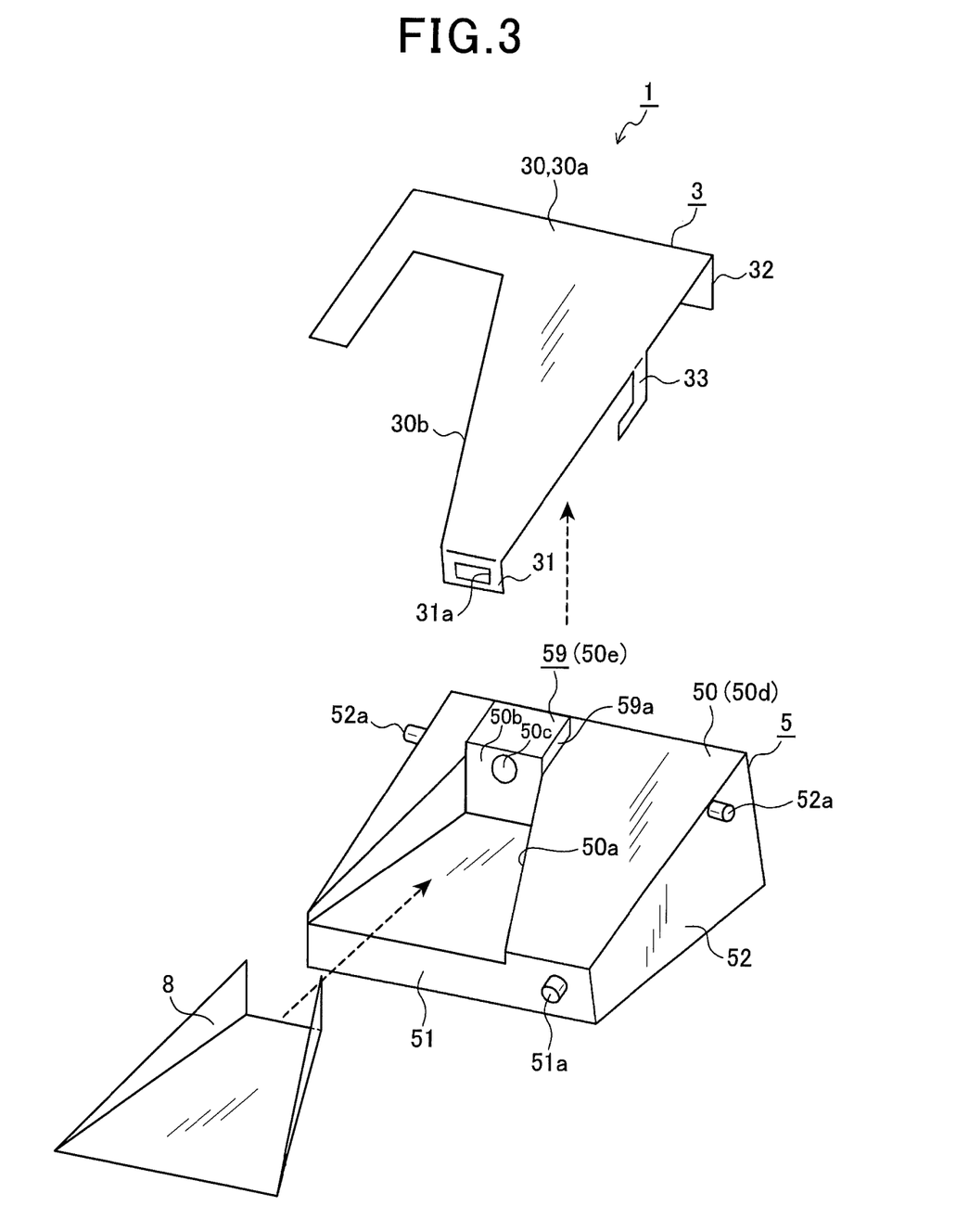
FIG. 3 is an exploded perspective view of the in-vehicle camera of the embodiment.

As shown in FIG. 3, the in-vehicle camera body 5 is formed into substantially a box-like shape with the upper surface 50. A part of the upper surface 50 is inclined upward in a direction from the front toward the rear. The in-vehicle camera body 5 has a facing portion and the projection portion 59 described later. The facing portion has the inclined upper surface 50d, and is disposed under the bracket 3 in a state where the in-vehicle camera body 5 is attached to the bracket 3.

The upper surface 50 of the in-vehicle camera body 5, in a plan view, has the recess 50a in a trapezoidal shape with an end on the front left being a lower base and with a right-left width narrowing toward the rear.

The recess 50a is for keeping the field of view of the in-vehicle camera body 5 from being obstructed, when it images the conditions ahead of the vehicle through the windshield.

The recess 50a is formed so as to be deeper toward the rear. Specifically, in this embodiment, the bottom surface of the recess 50a is formed as an inclined surface lowering forward in conformity to the expansion of a defined space described later. The distance between the bottom surface of the recess 50a and the upper surface 50d of the facing portion becomes large rearward.

The projection portion 59 is provided adjacent to the rear end of the recess 50a. The projection portion 59 has a step 59a disposed between the facing portion and the projection portion 59 and projected upward. That is, the upper surface 50e of the projection portion 59 is formed to project from the upper surface 50d of the facing portion toward the windshield in a state where the in-vehicle camera body 5 is mounted to the bracket 3.

The projection height of the projection portion 59 is not limited especially as long as it projects from the upper surface 50d of the facing portion. The projection portion 59 is disposed in a space formed along the windshield by the cut-out portion 30b of the bracket 3. That is, it is further preferred that the projection portion 59 is projected toward the windshield further than from an imaginary surface 30' (see FIG. 4) that is supposed when the attachment portion 30 is extended along the windshield. More preferably, the projection portion 59 is projected to a position where it contacts the windshield. In this embodiment, the in-vehicle camera body 5 is mounted to the bracket 3 such that the upper surface 50 of the in-vehicle camera body 5 contacts the lower surface of the bracket 3. The projection portion 59 is formed to have a height where the thickness of the attachment portion 30 is put on the upper surface 50 such that the upper end thereof contacts the windshield through the cut-out portion 30b.

The lens 50c for the camera is provided at an upper portion of the wall surface (front end surface) 50b, which faces the recess 50a, in the projection portion 59. The upper surface 50d of the facing portion is inclined to the optical axis O of the lens 50c.

The in-vehicle camera body 5 has a front side surface 51, as shown in FIG. 3. The front side surface 51 has a right end in the vicinity of which the engagement projection 51a is formed so as to be inserted and fitted into the engagement hole 31a, mentioned above, in mounting the in-vehicle camera body 5 to the bracket 3.

The in-vehicle camera body 5 also includes bosses 52a which are projected right and left from side surfaces 52 of the camera body and suspended by the respective hook portions 33 when the camera body is mounted to the bracket 3.

In a side view of the in-vehicle camera 1, the bosses 52a are each located at a position that makes shorter a distance from the front end of the engagement projection 51a to the boss 52a than a distance from the front end portion 31 to the base 33a. Further, the bosses 52a are each located at a position that makes longer a distance from the front end portion 31 to the boss 52a than a distance from the front end portion 31 to the front tip end of the corresponding hook 33b.

It will be noted that the extending portion in the claims corresponds to a part of the recess 50a and the facing portion ahead of the lens 50c.

Figure 4:
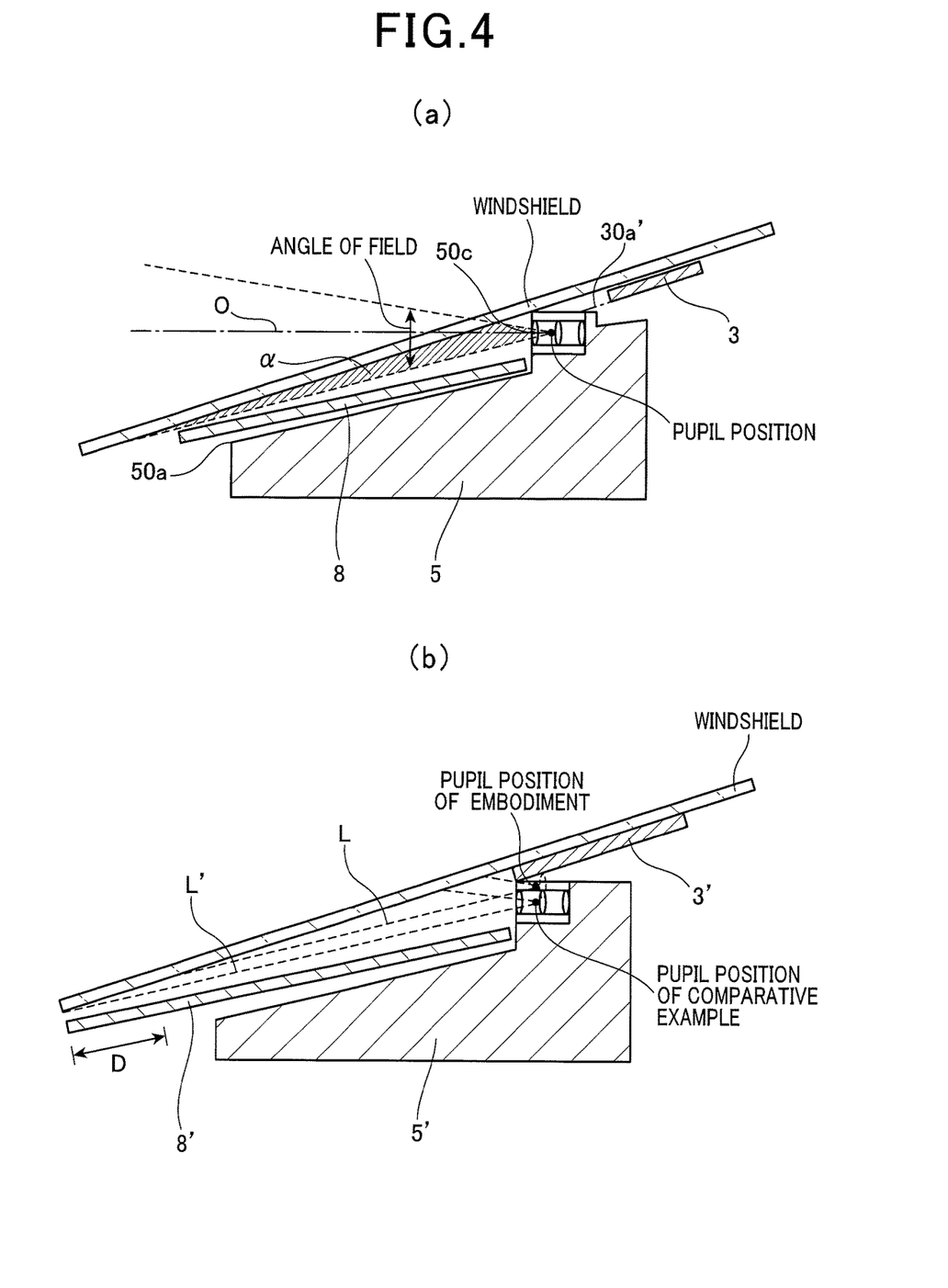
FIG. 4 shows (a) and (b), (a) is a schematic view showing a cross-sectional view taken along a line IV-IV of the in-vehicle camera of the embodiment shown in FIG. 1, and (b) is a schematic view showing a comparative example for describing effects of the embodiment.

The in-vehicle camera body 5 has a hood 8. This hood 8, as shown in (a) of FIG. 4, is a light-blocking member that prevents the light from entering from the exterior into an inhibition space including at least the defined space α. Here, the defined space α is a space which is formed between the lens 50c and the windshield when the in-vehicle camera body is mounted to the bracket, and which is defined by the angle of field of the in-vehicle camera body 5 (the portion hatched and surrounded by the wavy line in (a) of FIG. 4). In this embodiment, the hood 8 is disposed between the defined space α and the bottom surface of the recess 50a, extends ahead of the in-vehicle camera body 5, has a shape surrounding the defined space α, and separates the defined space α from the outer space.

Although the hood 8 is formed separately and detachably to the in-vehicle camera body 5 in this embodiment, it is not limited to this. That is, the hood 8 may be formed integrally into the in-vehicle camera body 5. Alternatively, for example, if the part of the in-vehicle camera body 5 which is ahead of the lens is long, the light-blocking portion may be formed by only the recess 50a.

It will be noted that, in (a) of FIG. 4, for making the defined space understandable, the cross-section portion of the windshield is shown by shading.

It will be noted that, aside from the lens 50c, the in-vehicle camera body 5 in this embodiment has three lenses arranged in tandem, and that components configuring the camera, such as an imager which is not shown in the drawings, are embedded in the in-vehicle camera body 5. The pupil position is set by these, and the above-described angle of field is defined from the pupil position as a starting point.

The inhibition space includes the defined space α, and shows a space surrounded by the hood 8, the windshield and the wall surface 50b.

Regarding Mounting Process

Hereinafter is described a process of mounting the in-vehicle camera 1 configured as described above to a windshield of a vehicle in the course of manufacturing the vehicle.

The in-vehicle camera 1 of this embodiment is used for imaging the conditions ahead of the vehicle and correctly detecting the positions of lane markers as viewed from the position of the camera and the presence/absence, for example, of lighting of the head lights of oncoming vehicles. Accordingly, the in-vehicle camera 1 is required to be correctly attached to the windshield.

Therefore, the bracket 3 is correctly attached in advance to a position that enables the detection mentioned above, at a stage where a windshield has been fabricated but is yet to be put on a vehicle assembly line.

The bracket 3 is attached to the windshield by applying an adhesive to the attachment surface 30a of the bracket 3 and sticking the surface onto the windshield.

In the vehicle assembly line, the in-vehicle camera body 5 is mounted to the bracket 3 after mounting the windshield to the vehicle using an adhesive but before the adhesive dries.

The hood 8 is attached to the in-vehicle camera body 5.

Figure 5:
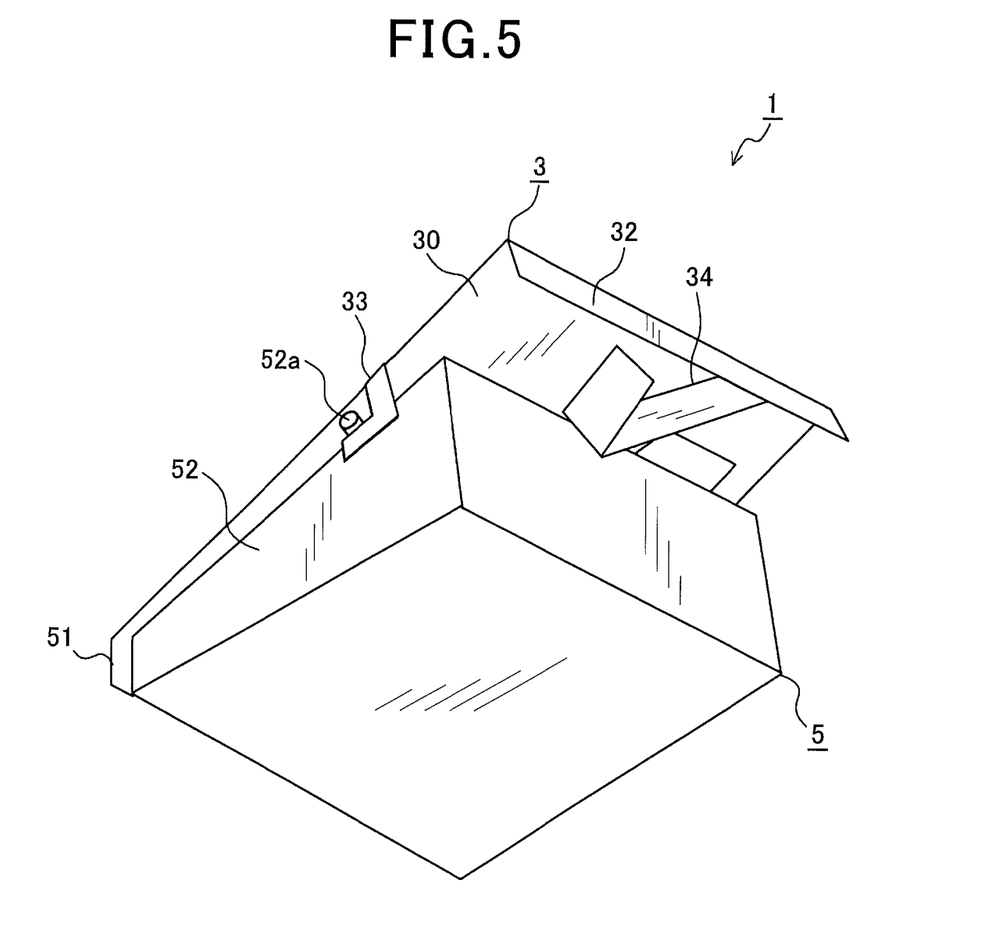
FIG. 5 is a perspective view of the in-vehicle camera of the invention, as viewed from obliquely below.

Next, as shown in FIG. 5, in the work of mounting the in-vehicle camera body 5 to the bracket 3, the bosses 52a are firstly hooked on the respective hook portions 33, while they are slid obliquely upward in the rear from below along the glass surface of the windshield.

With the sliding, the rear surface of the in-vehicle camera body 5 is eventually brought into contact with the leaf spring 34, first, to push and elastically deform the leaf spring 34.

In this embodiment, the bosses 52a are each provided to a position that makes shorter a distance from the front end of the engagement projection 51a to the boss 52a than a distance from the base 33a of the corresponding hook portion 33 to the front end portion 31. Therefore, upon contact of each of the bosses 52a with the base 33a of the corresponding one of the hook portions 33, the in-vehicle camera body 5 can be placed relative to the bracket 3 such that the engagement projection 51a is inserted and fitted into the engagement hole 31a, as shown in FIG. 1.

When the worker's hands that have supported the in-vehicle camera body 5 for the above work are removed after the placement, the in-vehicle camera body 5 is slightly returned back forward by the leaf spring 34, and along with this movement, the engagement projection 51a is inserted and fitted into the engagement hole 31a, as shown in FIG. 5. In this case, the bosses 52a do not come off from the respective hook portions 33 because the hook 33b of each of the hook portions 33 is formed so as to have a larger length than the that of the engagement projection 51a.

In this way, as shown in FIGS. 1 and 5, the in-vehicle camera body 5 is urged by the leaf spring 34 for the insertion of the engagement projection 51a into the engagement hole 31a, while being brought into contact with the front end portion 31. Further, the upper surface 50 of the in-vehicle camera body 5 is also brought into contact with a rear surface of the attachment portion 30 (surface opposed to the in-vehicle camera body 5) so as to press the in-vehicle camera body 5 against the bracket 3 for fixation.

Figure 6:
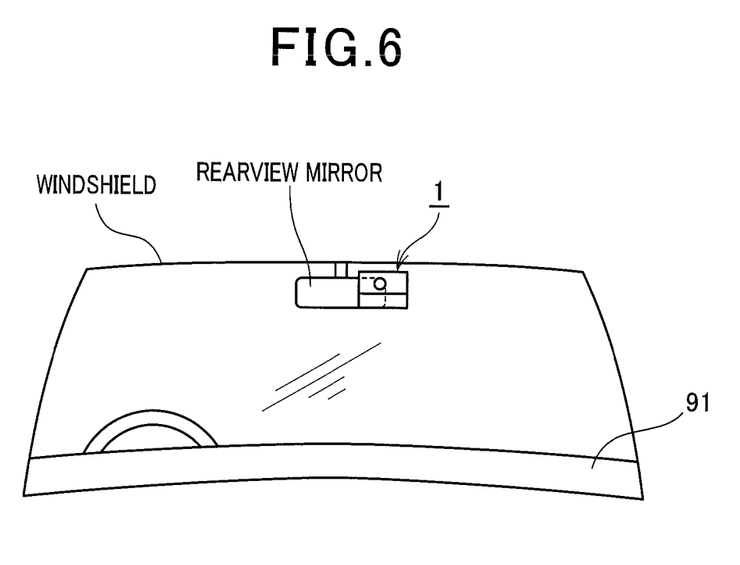
FIG. 6 is a schematic view of an example of a mounting position of an in-vehicle camera.

FIG. 6 is a view of the windshield viewed from the front. In this embodiment, as shown in FIG. 6, the in-vehicle camera 1 is disposed at a portion which is the inner surface of the windshield and behind the rearview mirror. The application of the present invention is not limited to this, as long as the in-vehicle camera is one attached and fixed to the inner surface of the windshield. The present invention may be applied to, for example, such a case where the in-vehicle camera 1 is disposed between a dash panel in the vehicle interior and the windshield.

Characteristic Effects of this Embodiment, Etc.

Hereinafter is described the effects of this embodiment, mainly referring to FIG. 4. (b) of FIG. 4 is a view showing an example of an in-vehicle camera that is out of the scope of the present invention. The in-vehicle camera body 5' does not have the projection portion, and the whole of the in-vehicle camera body 5' is disposed under the bracket 3'. Accordingly, as shown in the drawing, its pupil position is formed at a lower position by the thickness of the bracket 3 than the pupil position of this embodiment.

On the other hand, in the in-vehicle camera 1 of this embodiment, the lens 50c is provided at the projection portion 59 projecting from the upper surface 50 of the in-vehicle camera body 5 such that the position of the lens 50c is close to the windshield through the cut-out portion 30b provided in the bracket 3 when the in-vehicle camera body 5 is mounted to the bracket 3. The lens 50c can be disposed at the position of the shortest distance from the windshield, compared with the case where the lens 50c is disposed under the bracket 3' ((b) of FIG. 4). Accordingly, the length of the hood 8 can be shortened. That is, the lower limits L, L' of the respective defined spaces of this embodiment and the case where this embodiment is not applied are shown in (b) of FIG. 4. As shown by the lower limits L and L', the provision of the projection portion can shorten the hood 8 by the larger length D than the projection length which is not so large. Therefore, mountability of the in-vehicle camera can be improved significantly.

The in-vehicle camera 1 of this embodiment has not a structure where the whole upper portion of the in-vehicle camera body is closely arranged to the windshield, but a structure where the in-vehicle camera body is partially projected by providing the projection portion 59 having the lens. Accordingly, the bracket 3 can be disposed in a position except for the projection portion 59 and the defined space. Therefore, sufficient area of the surface attached to the windshield of the bracket 3 can be secured, and stable supporting structure of the in-vehicle camera body 1 by the bracket 3 can be realized.

Accordingly, the use of the in-vehicle camera 1 of this embodiment can secure a large area for the portion attached to the windshield in the bracket 3, and can shorten the length of the hood 8.

In this embodiment, the facing portion is formed to surround the periphery (except for the defined space) of the projection portion 59, and connected to the projection portion 59. However, it is not limited to this, for example, there is no need for forming behind the projection portion 59 or at the side of the projection portion 59. By forming the facing portion to surround the periphery of the projection portion 59, the area of the attachment portion 30 of the bracket 3 facing the facing portion can be formed large such that the attachment portion 30 surrounds the periphery of the projection portion 59. Accordingly, the in-vehicle camera 1 can be fixed to the windshield reliably.

Also, there is not necessarily a need for providing the attachment portion 30 with the front portion 30. However, making the attachment portion 30 be a shape which can cover the whole upper surface of the in-vehicle camera body 5 except for the defined space can disperse the load widely, which can prevent dropping reliably. Further, the present invention has the following advantage. Supporting the inclined surface where the lens is disposed across the inclined surface can increase the supporting area compared to the volume of the in-vehicle camera body 5. This can realize a stable supporting structure and make the whole including the bracket 3 be the size which does not hinder the driver's vision.

The bosses 52a of the in-vehicle camera body 5 are suspended by the respective hook portions 33 possessed by the bracket 3 that has been attached to the windshield in advance, so that the leaf spring 34 is elastically deformed. Further, the in-vehicle camera body 5 is placed at a position that enables insertion and fitting of the engagement projection 51a into the engagement hole 31a. In this state, with the removal of the worker's hands that have supported the in-vehicle camera body 5, the in-vehicle camera body 5 is pressed by the leaf spring 34 against the front end portion 31 and the attachment portion 30 of the bracket 3 and fixed.

Therefore, the in-vehicle camera body 5 can be mounted to the windshield without permitting the windshield to come off from the vehicle by being strongly pushed by a jig or the like via the bracket 3, or without scratching the windshield by such a jig.

In the in-vehicle camera 1 of this embodiment, the leaf spring 34 presses the in-vehicle camera body 5 against the bracket 3 for fixation. Therefore, the in-vehicle camera body 5 cannot suffer from a problem of backlash relative to the bracket 3 due to the tolerances.

Thus, in the in-vehicle camera 1 of this embodiment, the in-vehicle camera body 5 can be reliably fixed to a windshield.

In the in-vehicle camera 1 of this embodiment, the in-vehicle camera body 5 is hooked on the hook portions 33 via the respective bosses 52a while the engagement projection 51a is engaged with the engagement hole 31a, and the in-vehicle camera body 5 is pressed against the front end portion 31 of the bracket 3. Thus, the in-vehicle camera body 5 can be reliably fixed to the bracket 3.

As far as the spirit of the present invention recited in the claims is agreed with, the present invention should not be construed as being limited to the embodiment described above.

What is claimed is:

1. An in-vehicle camera, comprising:
a bracket to be attached to an inner surface of a windshield; and
an in-vehicle camera body assembly having a wedge-like shape when viewed from a left-right direction of the vehicle and having a lens and fixed to the bracket, wherein:
the bracket has an attachment portion and a mounting portion, the attachment portion being attached to the windshield, the mounting portion supporting the in-vehicle camera body assembly under the attachment portion;
the in-vehicle camera body assembly has a facing portion, and a projection portion, the facing portion being disposed under the attachment portion when the in-vehicle camera body assembly is fixed to the bracket, the projection portion having a step projecting from the facing portion, the lens being provided to the projection portion, and
the attachment portion has a first cut-out portion forming a space along the windshield above the projection portion when the in-vehicle camera body assembly is fixed to the bracket;
the attachment portion includes an attachment surface attached to the windshield, the attachment surface having a rear portion disposed behind the lens and a front portion extending ahead of the lens, and having a shape substantially covering an upper surface of the wedge-like shaped in-vehicle camera body assembly;

the first cut-out portion defines a cut-out area of the bracket, the cut-out area being cut-out from the attachment portion of the bracket;

the projection portion is exposed to the cut-out area; and the cut-out area is larger than an area of the projection portion exposing to the first cut-out portion;

the facing portion has an extending front surface extending to a front side of the facing portion relative to the projection portion;

the extending front surface defines a light passing space in front of the lens; and the light passing space is separated from a space of an interior of the vehicle by the extending front surface.

2. The in-vehicle camera according to claim 1, wherein the projection portion is formed to project into the space formed along the windshield by the first cut-out portion.

3. The in-vehicle camera according to claim 2, wherein the extending front surface has a recess forming an inhibition space including at least a defined space defined by an angle of field of the in-vehicle camera body assembly through the lens in a space between the lens and the windshield.

4. The in-vehicle camera according to claim 3, wherein the rear portion is formed to surround the projection portion behind the defined space.

5. The in-vehicle camera according to claim 4, wherein the front portion has a second cut-out portion forming the defined space.

6. The in-vehicle camera according to claim 1, further comprising a light-blocking portion formed by a hood detachably attached to the in-vehicle camera body assembly.

* * * * *